(12) United States Patent
Seino et al.

(10) Patent No.: US 12,535,849 B2
(45) Date of Patent: Jan. 27, 2026

(54) CONTROL DEVICE CONFIGURED TO BE TILTED ABOUT EACH OF FIRST AND SECOND TURN AXES

(71) Applicant: Alps Alpine Co., Ltd., Tokyo (JP)

(72) Inventors: Fumitaka Seino, Miyagi-ken (JP); Masatoshi Ono, Miyagi-ken (JP); Toru Nishioka, Tokyo (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/910,062

(22) Filed: Oct. 9, 2024

(65) Prior Publication Data

US 2025/0028349 A1   Jan. 23, 2025

Related U.S. Application Data

(63) Continuation of application No. PCT/JP2023/007412, filed on Feb. 28, 2023.

(30) Foreign Application Priority Data

Apr. 21, 2022 (JP) ................. 2022-069991

(51) Int. Cl.
*G05G 9/047* (2006.01)
*G05G 5/04* (2006.01)
*G05G 5/05* (2006.01)

(52) U.S. Cl.
CPC ............. *G05G 9/047* (2013.01); *G05G 5/04* (2013.01); *G05G 5/05* (2013.01); *G05G 2009/04718* (2013.01); *G05G 2009/04766* (2013.01)

(58) Field of Classification Search
CPC .......... G05G 2009/04714; G05G 2009/04718; G05G 2009/04722; G05G 2009/04725;
(Continued)

(56) References Cited

U.S. PATENT DOCUMENTS 6,946,606 B2   9/2005   Kitagawa
11,829,181 B2   11/2023   Ito et al.
(Continued)

FOREIGN PATENT DOCUMENTS

CN   203674055 U   6/2014
JP   H10-283885   * 10/1998
(Continued)

*Primary Examiner* — Minnah L Seoh
*Assistant Examiner* — Gregory T Prather
(74) *Attorney, Agent, or Firm* — Harness, Dickey & Pierce, P.L.C.

(57) ABSTRACT

A control device includes a housing, a control member including a shaft portion to be tilted to turn about a first turn axis intersecting a direction the shaft portion extends, a first interlock member including a first shaft support portion supported by the housing turnably about the first turn axis to be turned with a tilting operation on the control member, a return member to apply a return force to return the control member to a neutral position to the control member, an urging member to apply the return force via the return member to the control member, and a first turn detection section to detect a turn of the first interlock member. The return member includes a bottom portion and a receiving portion, the housing includes a receiving bottom section having a stopper, and the bottom portion has a through hole through which the stopper is to be inserted.

7 Claims, 6 Drawing Sheets

(58) Field of Classification Search
CPC ......... G05G 2009/04766; G05G 9/047; G05G 5/04; G05G 5/05
See application file for complete search history.

(56) References Cited

U.S. PATENT DOCUMENTS

2009/0295724 A1* 12/2009 Cheng ................... G05G 9/047
345/161
2021/0236919 A1* 8/2021 Endo ..................... H01H 25/04

FOREIGN PATENT DOCUMENTS

JP      2004-103253 A     4/2004
WO    2021-246003 A1   12/2021

\* cited by examiner

CONTROL DEVICE CONFIGURED TO BE TILTED ABOUT EACH OF FIRST AND SECOND TURN AXES

CLAIM OF PRIORITY

This application is a Continuation of International Application No. PCT/JP2023/007412 filed on Feb. 28, 2023, which claims benefit of Japanese Patent Application No. 2022-069991 filed on Apr. 21, 2022. The entire contents of each application noted above are hereby incorporated by reference.

BACKGROUND OF THE INVENTION

1. Field of the Invention

The present invention relates to a control device having a control member configured to be tilted in a desired direction for input.

2. Description of the Related Art

As an example of control devices having a control member such as a control lever configured to be tilted for input, Japanese Unexamined Patent Application Publication No. 2004-103253 discloses a depression switch and a multi-directional input device that provide a good tactile response in a depressing operation and good operability. This depression switch includes a key top provided in a case fixed on a substrate so as to be movable in an up-down direction, an elastically deformable movable contact piece that comes into contact with the key top moved downward and has a substantially upside down concave-shaped cross section, one fixed electrode provided below an end portion of the movable contact piece on the substrate, the other fixed electrode provided at a position where the other fixed electrode comes into contact with a central portion of the elastically deformed movable contact piece on the substrate, and a spacer electrically connecting the end portion of the movable contact piece to the one fixed electrode.

Chinese Registered Utility Model No. 203674055 discloses a rotation input device with good operability. A reset mechanism of the rotation input device includes a spring housing for positioning on a housing cavity bottom surface. The spring housing includes a first spring and a second spring embedded in the first spring, a diameter of the second spring is smaller than a diameter of the first spring, a slide block is provided on the spring housing, and the slide block can reciprocate in a vertical direction in response to receiving a housing stopper.

Some control devices can receive a pushing operation for pushing a control member together with an operation of tilting the control member. To enable these operations, such control devices need to be designed such that the tilting operation and the pushing operation of a control member do not interfere with components in a control device and to be provided with a stopper for reducing excessive deformation of an interlock member for turnably supporting the control member when the control member is pushed.

The present invention has been made in view of the above-described problems, and is directed to provide a control device that can reliably regulate a pushing operation while ensuring an area for a tilting movement of a control member.

SUMMARY OF THE INVENTION

According to an aspect of the present invention, there is provided a control device including a housing, a control member including a shaft portion extending in a direction, the control member being configured to be tilted to turn about a first turn axis intersecting the direction in which the shaft portion extends, a first interlock member including a first shaft support portion supported by the housing turnably about the first turn axis, the first interlock member being configured to be turned in conjunction with a tilting operation on the control member, a return member configured to apply a return force to return the control member to a neutral position to the control member, an urging member configured to apply the return force via the return member to the control member, and a first turn detection section configured to detect a turn of the first interlock member. The return member includes a bottom portion in contact with a first end portion that is an end portion of the control member in the extending direction, and a receiving portion provided around the bottom portion, the receiving portion receiving an end of the urging member, the housing comprises a receiving bottom section configured to receive the other end of the urging member, the receiving bottom section has a stopper protruding in an urging direction of the urging member, and the bottom portion has a through hole through which the stopper is configured to be inserted.

With this structure, when a predetermined external force for compressing the urging member is applied to the control member, the stopper protrudes through the through hole and comes into contact with one end portion of the control member in the extending direction. Accordingly, the control member can be prevented from being pushed downward excessively, and the occurrence of functional failure of the device can be suppressed.

In this control device, it is preferable that a protrusion height of the stopper be set such that the stopper protrudes through the through hole and comes into contact with the first end portion when a predetermined external force for compressing the urging member is applied to the control member. With this structure, when a predetermined external force is not applied to the control member, the stopper does not protrude through the through hole, preventing interference between the stopper and the control member when the control member is tilted. On the other hand, when a predetermined external force is applied to the control member, the stopper protrudes through the through hole, and thereby the pushing operation on the control member is regulated at the position where the first end portion comes into contact with the stopper.

In this control device, the first end portion may have a bottom contact portion in contact with the bottom portion, and stopper contact portion configured not to come into contact with the bottom portion and to come into contact with the stopper. This structure facilitates the design for avoiding interference between the first end portion and the stopper in a tilting movement of the control member.

In this control device, the bottom contact portion may be located around the stopper contact portion and protrude toward the bottom portion side more in the extending direction than the stopper contact portion. With this structure, a noncontact state of the stopper contact portion with the bottom portion can be stably implemented in the tilting movement of the control member.

In this control device, the first end portion may have a countersunk portion provided around the stopper contact portion. This structure can stably prevent portions other than the stopper contact portion in the first end portion from coming into contact with the stopper.

In this control device, a portion of the bottom portion around the through hole may protrude more than the other portions. With this structure, a contact state of the bottom contact portion with the bottom portion can be stably implemented when the control member is tilted.

DESCRIPTION OF THE PREFERRED EMBODIMENTS

Figure 1:
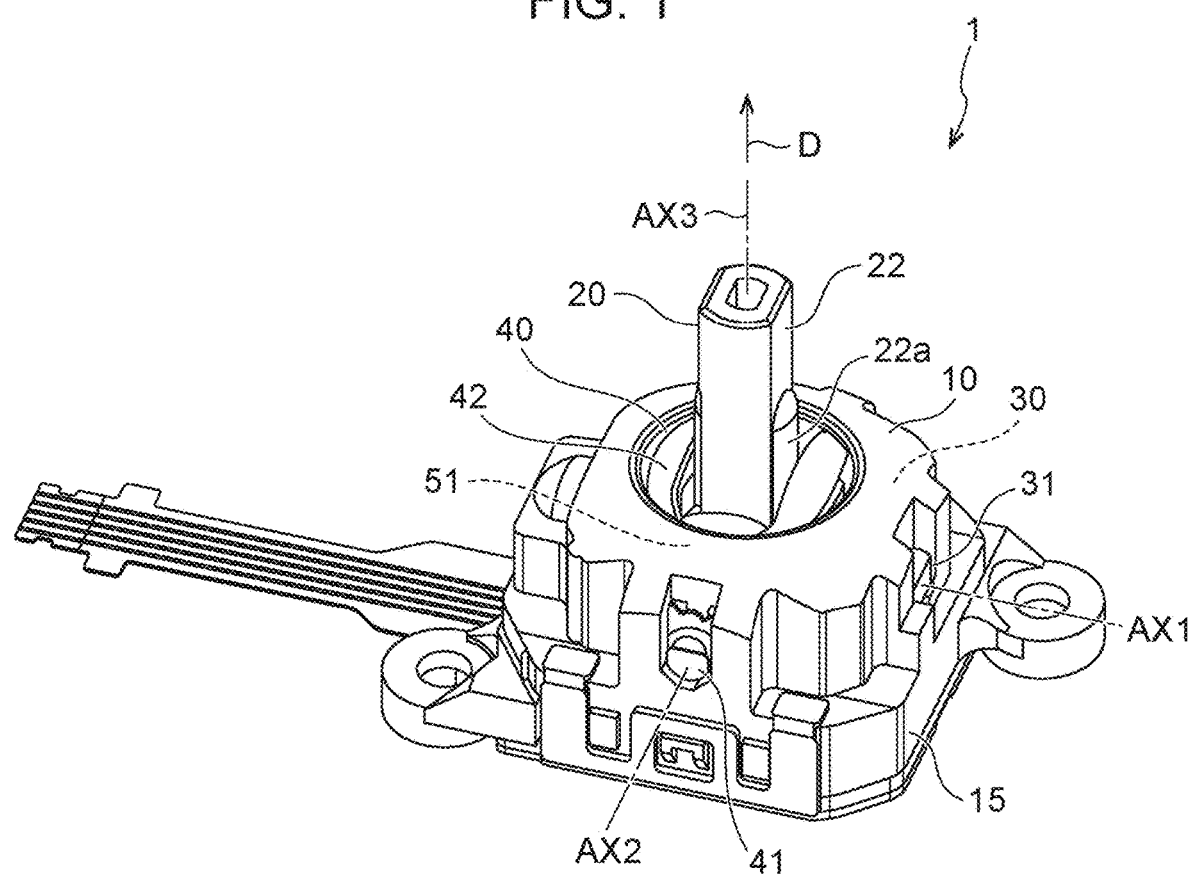
FIG. 1 is a perspective view illustrating a control device according to an embodiment.
Figure 2:
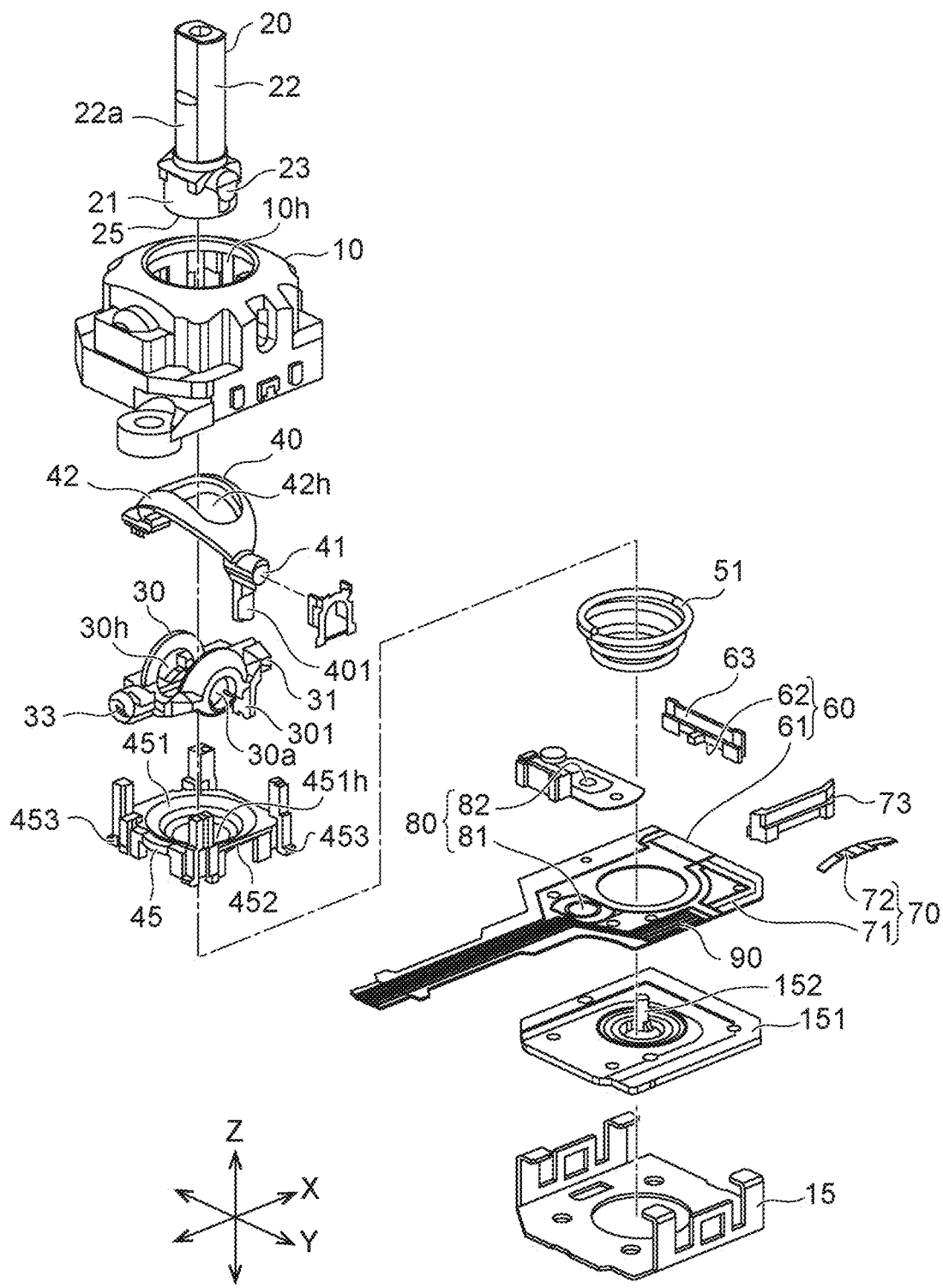
FIG. 2 is an exploded perspective view illustrating a structure of a control device according to an embodiment.

Hereinafter, an embodiment of the invention will be described in detail with reference to the attached drawings. In the following descriptions, the same reference numerals are given to the same components and descriptions of the components described once will be omitted as appropriate.
Structure of Control Device FIG. 1 is a perspective view illustrating a control device according to the embodiment. FIG. 2 is an exploded perspective view illustrating a structure of the control device according to the embodiment. A control device 1 according to the embodiment is a device configured to receive an input in response to an operation of tilting a control member 20 with respect to a housing 10. Among axes of turn in tilting the control member 20 in the description of the embodiment, it is defined that a first turn axis AX1 is parallel to the X-axis, a second turn axis AX2 is parallel to the Y-axis, and an axis (neutral axis AX3) at a neutral position of the control member 20 is parallel to the Z-axis. In the Z-axis direction, it is defined that a side toward which the control member 20 at the neutral position extends is referred to as an upper side in the Z-axis direction (up, upward), and the opposite side is referred to as a lower side in the Z-axis direction (down, downward).

The control device 1 includes the housing 10, the control member 20, a first interlock member 30, a second interlock member 40, an urging member 51, a first turn detection section 60, and a second turn detection section 70. The housing 10 has a substantially box shape and has an opening at a lower portion. A hole 10h for positioning the control member 20 is provided at an upper central portion of the housing 10. A bottom plate member 15 is provided as a part of the housing 10 at the lower opening portion of the housing 10. The housing 10 may contain, as a non-limiting example, a resin-based material, for example, polyester such as polybutylene terephthalate, or polyamide, or a metallic material such as an iron-based material, an aluminum-based material, or a copper-based material. The bottom plate member 15 may contain the same material as the material contained in the housing 10, or may contain a different material. As a specific example case in which the housing 10 and the bottom plate member 15 contain different materials, the housing 10 may contain a resin-based material, and the bottom plate member 15 may contain a metallic material.

The control member 20 includes a cylindrical portion 21 disposed in the housing 10 and a shaft portion 22 that extends outward from the inner side of the housing 10 through the hole 10h and extends in a direction (extending direction D). When the control member 20 is at the neutral position, the extending direction D of the shaft portion 22 is parallel to the Z-axis, whereas, when the control member 20 is tilted, the extending direction D of the shaft portion 22 is not parallel to the Z-axis. The control member 20 can be tilted about each of the first turn axis AX1 and the second turn axis AX2 with respect to the housing 10.

The first interlock member 30 has a first shaft support portion 31 that is supported by the housing 10 turnably about the first turn axis AX1 and is turned in conjunction with a tilting operation on the control member 20. The first interlock member 30 has a frame shape and has a hole 30h at a center. The control member 20 is inserted through the center hole 30h of the first interlock member 30. A fit protruding portion 23 protrudes from the cylindrical portion 21 of the control member 20. The fit protruding portion 23 slidably fits into a fitting hole 30a provided in the first interlock member 30. The first interlock member 30 may contain, as a non-limiting example, a resin-based material such as polyacetal, polyester, or polyamide.

The second interlock member 40 has a second shaft support portion 41 that is supported by the housing 10 turnably about the second turn axis AX2 and is turned in conjunction with a tilting operation on the control member 20. The second interlock member 40 has an arched arch portion 42. A hole 42h is provided at a center of the arch portion 42 of the second interlock member 40. The shaft portion 22 of the control member 20 is inserted through the center hole 42h of the arch portion 42 of the second interlock member 40. The shaft portion 22 of the control member 20 has a convex portion 22a. The convex portion 22a comes into contact with the arch portion 42 in a state in which the control member 20 is inserted through the hole 42h of the arch portion 42 such that the shaft portion 22 slidably fits into the hole 42h.

The second interlock member 40 is disposed to cover the first interlock member 30 in the Y-axis direction. In a state in which the second interlock member 40 covers the first interlock member 30 and the shaft portion 22 of the control member 20 is inserted through the hole 30h of the first interlock member 30 and the hole 42h of the second interlock member 40, these components are incorporated into the housing 10. The second interlock member 40 may contain, as a non-limiting example, a resin-based material such as polyacetal, polyester, or polyamide.

The urging member 51 urges the control member 20 to push the first shaft support portion 31 of the first interlock member 30 against the housing 10 and provide a return force for returning the control member 20 to the neutral position to the control member 20. The urging member 51 is, for example, a coil spring. The urging member 51 urges the control member 20 via a return member 45.

The return member 45 is disposed below the control member 20 (closer to the bottom plate member 15 side than the first interlock member 30 is) and is pushed downward in conjunction with a tilting of the control member 20. The urging member 51 is incorporated between the return member 45 and a receiving bottom section 151 that is in contact with the bottom plate member 15.

The return member 45 includes a bottom portion 451 that is in contact with a first end portion 25 that is an end portion (lower end) of the control member 20 in the extending direction and a receiving portion 452 that is disposed around the bottom portion 451 and receives an end of the urging member 51. More specifically, one end (upper end) of the urging member 51 is received by the receiving portion 452 and the other end (lower end) is received by the receiving bottom section 151. With this structure, the urging member 51 urges upward the control member 20 via the return member 45.

The receiving portion 452 has a plurality of engaging portions 453 on an outer peripheral side. The engaging portions 453 engage the housing 10. With this structure, the return member 45 serves as a guide for the housing 10 in sliding in the up-down direction.

A stopper 152 that protrudes in the urging direction of the urging member 51 is provided in a central portion of the receiving bottom section 151. The bottom portion 451 of the return member 45 has a through hole 451h in a central portion, and the stopper 152 protruding from the receiving bottom section 151 can be inserted through the through hole 451h.

The first turn detection section 60 detects a turn of the first interlock member 30, and the second turn detection section 70 detects a turn of the second interlock member 40. The first turn detection section 60 includes, for example, an electrical-resistance sensor 61 and a brush 62. The second turn detection section 70 includes, for example, an electrical-resistance sensor 71 and a brush 72. The electrical-resistance sensors 61 and 71 are formed on a circuit board 90 such as a flexible printed circuit board. The brushes 62 and 72 are attached to a holder 63 and a holder 73 respectively. The brushes 62 and 72 are mounted so as to slide together with the holders 63 and 73 on the electrical-resistance sensors 61 and 71 respectively.

The holder 63 with the brush 62 attached can be slid in conjunction with a swing of a claw portion 301 provided to the first interlock member 30. With this structure, the claw portion 301 is caused to swing by a turn of the first interlock member 30 about the first turn axis AX1 and the swing causes the holder 63 to slide on the electrical-resistance sensor 61. The electrical resistance values change depending on positions of the brush 62 on the electrical-resistance sensor 61, and by using the electrical resistance values, the turn of the first interlock member 30 about the first turn axis AX1 can be detected.

The holder 73 with the brush 72 attached can be slid in conjunction with a swing of a claw portion 401 provided to the second interlock member 40. With this structure, the claw portion 401 is caused to swing by a turn of the second interlock member 40 about the second turn axis AX2 and the swing causes the holder 73 to slide on the electrical-resistance sensor 71. The electrical resistance values change depending on positions of the brush 72 on the electrical-resistance sensor 71, and by using the electrical resistance values, the turn of the second interlock member 40 about the second turn axis AX2 can be detected.

A displacement detection section 80 is attached to the circuit board 90. The displacement detection section 80 includes, for example, a contact pattern 81 formed on the circuit board 90 and a contact sheet 82 disposed on the contact pattern 81. The displacement detection section 80 detects a displacement of the control member 20 in a direction different from both about the first turn axis AX1 and about the second turn axis AX2. In this embodiment, the displacement detection section 80 detects a displacement along the extending direction of the control member 20.

The first interlock member 30 has an arm portion 33 that extends from the side opposite to the side on which the first shaft support portion 31 is provided above the displacement detection section 80. For example, when the control member is pushed (hereinafter, this operation of pushing is also referred to as a "pushing operation") in a direction opposite to the direction the control member 20 extends from the housing 10, the pivot is located on the first shaft support portion 31 side, and the pushing force causes the arm portion 33 of the first interlock member 30 to be pushed toward the displacement detection section 80 side. This displacement of the arm portion 33 pushes the contact sheet 82 to bring the contact sheet 82 and the contact pattern 81 to come into contact with each other, that is, the displacement detection section 80 is brought to a conducting state. Accordingly, the pushing operation on the control member 20 can be detected.

Tilting operation and Return Operation

Figure 3:
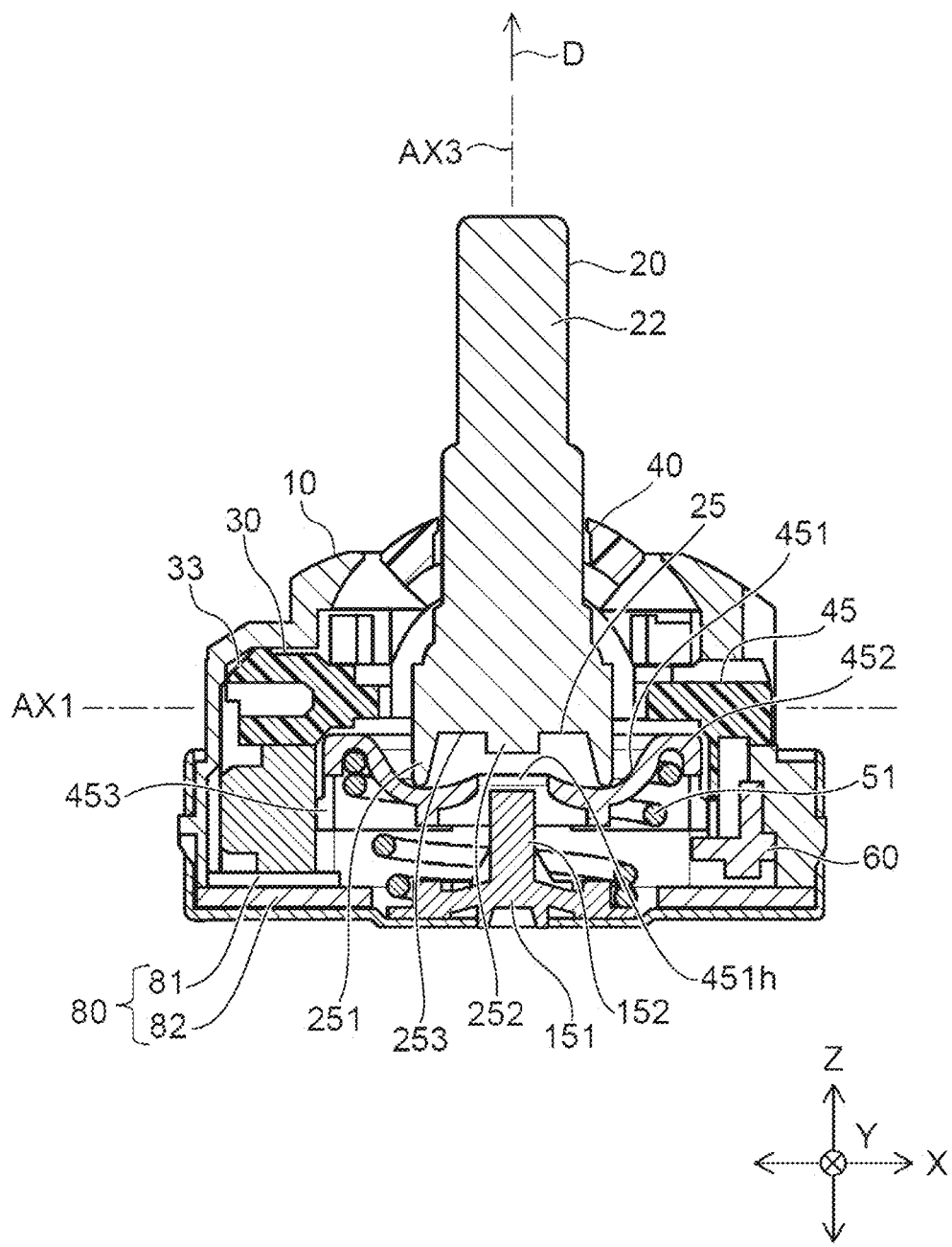
FIG. 3 is a cross-sectional view illustrating a control member in a neutral position.
Figure 4:
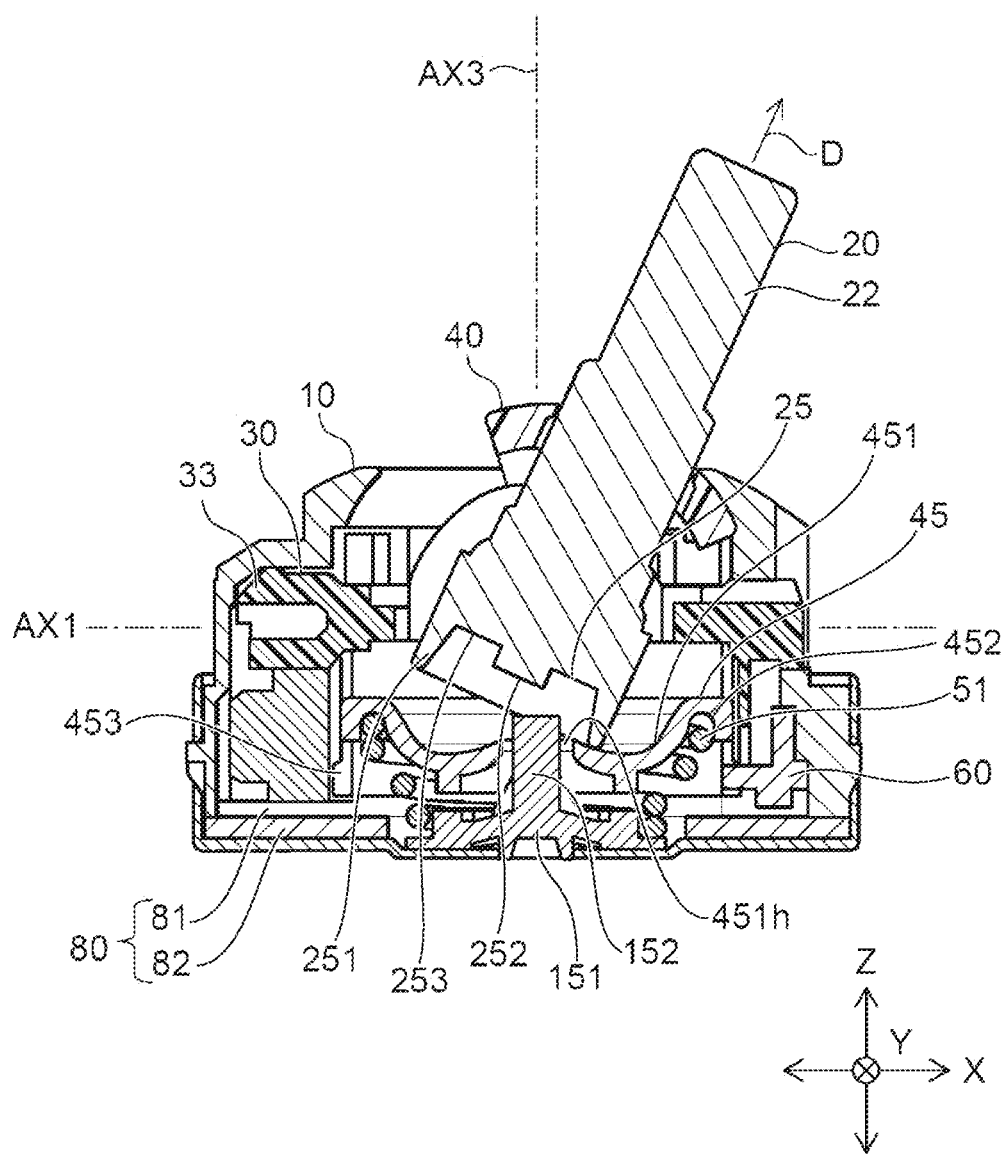
FIG. 4 is a cross-sectional view illustrating a control member in a tilted state.

FIG. 3 is a cross-sectional view illustrating the control member in a neutral position. FIG. 4 is a cross-sectional view illustrating the control member in a tilted state. FIG. 3 and FIG. 4 are cross-sectional views (cross sections on the XZ plane) viewed in the Y direction. As illustrated in FIG. 3, when the control member 20 is in the neutral position, the return member 45 receives an urging force produced by the urging member 51 and is located at a highest position. An upper limit position of the return member 45 is a position at which a plurality of engaging portions 453 provided on an outer peripheral side of the receiving portion 452 come into contact with the housing 10.

The first end portion 25 of the control member 20 has a bottom contact portion 251 that is in contact with the bottom portion 451 of the return member 45 and a stopper contact portion 252 configured not to come into contact with the bottom portion 451 and to come into contact with the stopper 152. The bottom contact portion 251 is located around the stopper contact portion 252 and protrudes toward the bottom portion 451 side more in the Z direction than the stopper contact portion 252. The bottom contact portion 251 has a cylindrical shape about the axis of the control member 20.

The stopper contact portion 252 may protrude or may not protrude toward the bottom portion 451 side in the Z direction. When the stopper contact portion 252 protrudes toward the bottom portion 451 side in the Z direction, a countersunk portion 253 is provided around the stopper contact portion 252.

A portion around the through hole 451h of the bottom portion 451 with which the bottom contact portion 251 is in contact protrudes more than the other portions. When the control member 20 is in the neutral position, the bottom contact portion 251 is in contact with the bottom portion 451 at a lowest position in the Z direction. The urging force produced by the urging member 51 is applied to the control member 20 via the return member 45. This urging force brings the bottom contact portion 251 to come into contact with the lowest position of the bottom portion 451 in the Z direction. Accordingly, the force to return to the neutral position is applied to the control member 20.

As illustrated in FIG. 4, when the control member 20 is tilted, the contact position of the bottom contact portion 251 on the tilted side at which the bottom contact portion 251 comes into contact with the bottom portion 451 moves toward the through hole 451h side. Since the portion around the through hole 451h of the bottom portion 451 protrudes more than the other portions, when the protruding portion comes into contact with the bottom contact portion 251, the return member 45 outweighs the urging force of the urging member 51 and is pushed downward. The return member 45 pushed downward compresses the urging member 51.

When the tilting operation on the control member 20 is released, the compressed urging member 51 expands to push the return member 45 upward. Accordingly, the contact position of the bottom contact portion 251 with the bottom portion 451 moves from the protruding portion around the through hole 451h to a lower position outside the protruding portion. Then, the force to move the contact position of the bottom contact portion 251 to the lowest position of the bottom portion 451 in the Z direction works as a return force, causing the control member 20 to return to the neutral position.

In such tilting movement and return movement of the control member 20, the stopper 152 protruding upward from the receiving bottom section 151 does not interfere with the control member 20. In other words, the stopper contact portion 252 does not come into contact with the stopper 152 in the tilting movement and the return movement of the control member 20 and thus does not affect the movement of the control member 20. In addition, since the bottom contact portion 251 protrudes toward the bottom portion 451 side more in the Z direction than the stopper contact portion 252, the noncontact state of the stopper contact portion 252 with the bottom portion 451 can be stably implemented in the tilting movement of the control member 20.

Pushing Operation

Figure 5:
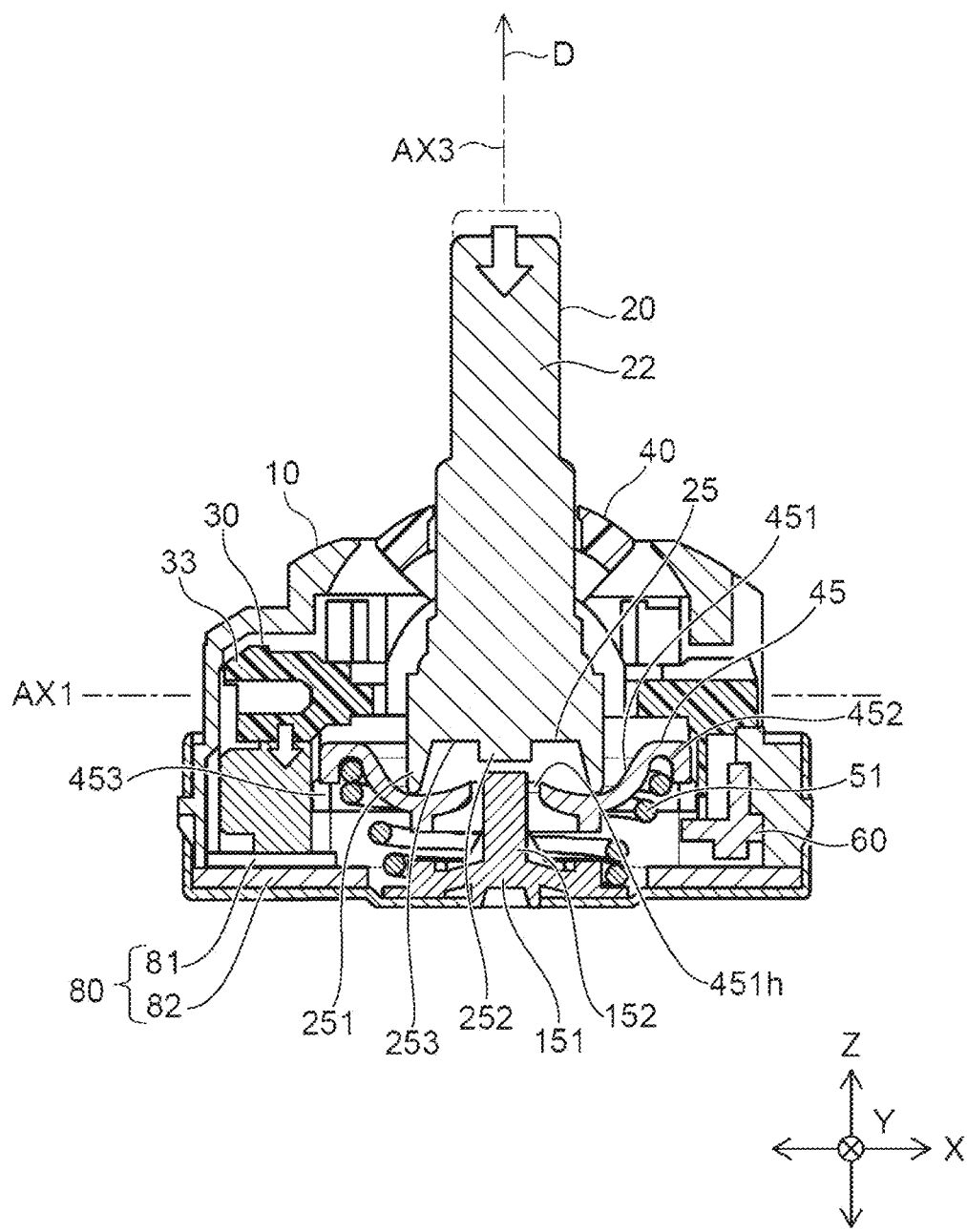
FIG. 5 is a cross-sectional view illustrating a control member receiving a pushing operation.
Figure 6:
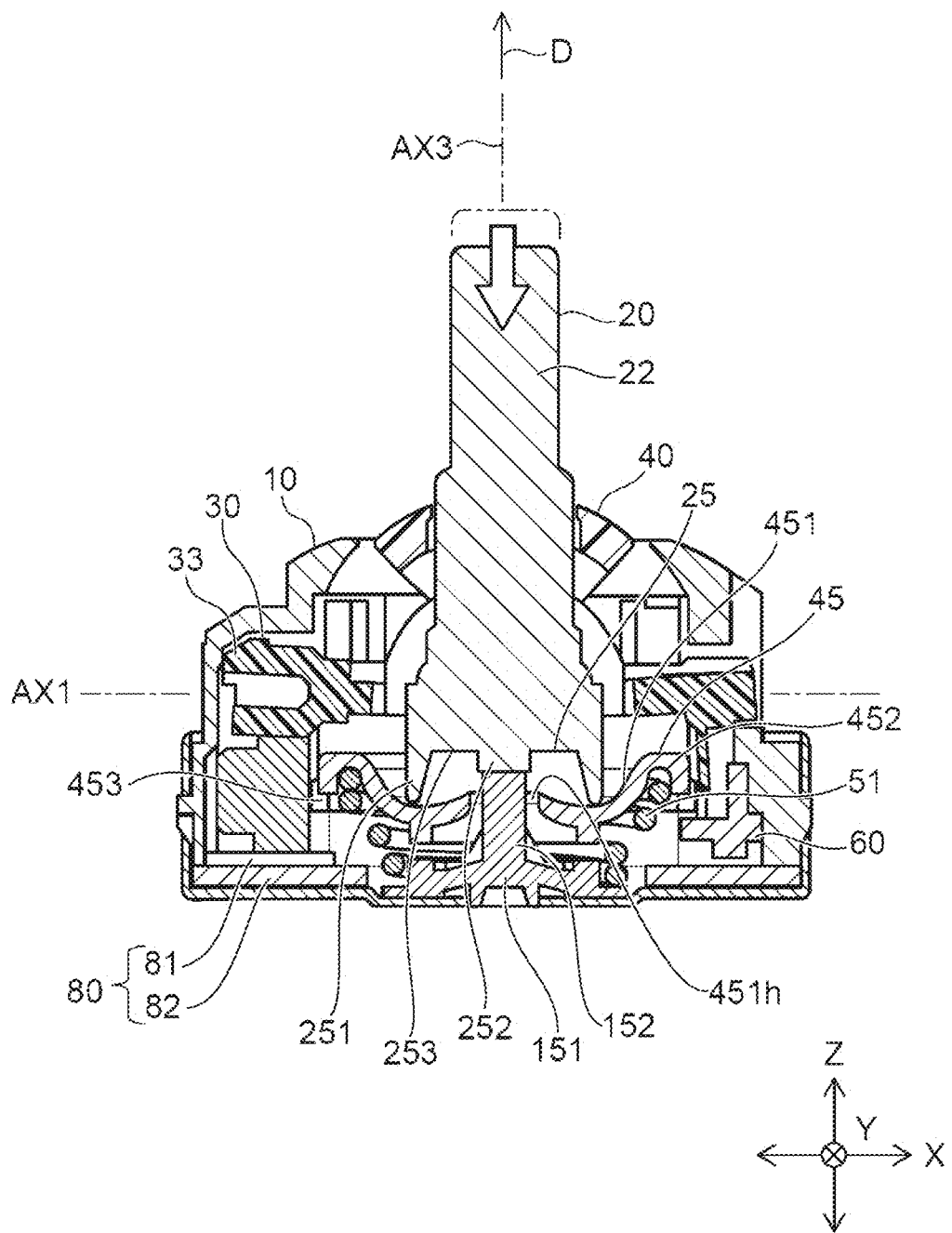
FIG. 6 is a cross-sectional view illustrating a control member in a further pushed state.

FIG. 5 is a cross-sectional view illustrating the control member receiving a pushing operation. FIG. 6 is a cross-sectional view illustrating the control member in a further pushed state. FIG. 5 and FIG. 6 are cross-sectional views (cross sections on the XZ plane) viewed in the Y direction. As illustrated in FIG. 5, when a pushing operation is performed on the control member 20, the return member 45 is pushed downward by the pushing force. More specifically, the bottom contact portion 251 of the control member 20 pushes the bottom portion 451 of the return member 45 and the return member 45 moves downward. The downward movement of the return member 45 compresses the urging member 51.

In addition, the pushing force applied by the pushing operation to the control member 20 causes the first interlock member 30 engaging the control member 20 to move downward. The first interlock member 30 moves to push down the arm portion 33 with the first shaft support portion 31 side as a pivot. This displacement of the arm portion 33 pushes the contact sheet 82 to bring the contact sheet 82 and the contact pattern 81 to come into contact with each other, that is, the displacement detection section 80 is brought to a conducting state. Accordingly, the pushing operation on the control member 20 can be detected.

When the control member 20 is pushed by the pushing operation and the return member 45 is pushed downward, the stopper contact portion 252 approaches the stopper 152 and the stopper 152 is inserted through the through hole 451h of the bottom portion 451. However, the stopper contact portion 252 does not come into contact with the stopper 152 with the external force applied by the normal pushing operation.

When the pushing operation on the control member 20 is released, the compressed urging member 51 expands to push the return member 45 upward. The control member 20 is moved upward by the upward pushing of the return member 45 and the arm portion 33 of the first interlock member 30 is also moved upward in conjunction with the movement. When the arm portion 33 is moved upward, the contact state of the contact sheet 82 with the contact pattern 81 is released, and the displacement detection section 80 is brought into a non-conducting state. Accordingly, the release of the pushing operation on the control member 20 can be detected.

As illustrated in FIG. 6, when a predetermined external force (for example, an excessive external force) is applied in the direction in which the control member 20 is pushed, a central portion of the first interlock member 30 receives the pushing force from the control member 20 with the arm portion 33 and the first shaft support portion 31 as pivots and is bent downward and deformed. The first interlock member 30 that is deformed to some extent causes the stopper contact portion 252 of the first end portion 25 of the control member 20 and the stopper 152 to come into contact with each other, and thereby further pushing operation on the control member 20 is regulated. With this structure, plastic deformation of the first interlock member 30 and functional failure of other components can be prevented.

More specifically, the protrusion height of the stopper 152 is set such that the stopper 152 protrudes through the through hole 451h and comes into contact with the first end portion 25 when a predetermined external force for compressing the urging member 51 is applied to the control member 20. With this structure, when a predetermined external force is not applied to the control member 20, the stopper 152 does not protrude through the through hole 451h, preventing interference between the stopper 152 and the control member 20 when the control member 20 is tilted. On the other hand, when a predetermined external force is applied to the control member 20, the stopper 152 protrudes through the through hole 451h, and thereby the pushing operation on the control member 20 is regulated at the position where the first end portion 25 comes into contact with the stopper 152.

In this embodiment, since the countersunk portion 253 is provided around the stopper contact portion 252, when a predetermined external force is applied to the control member 20, it can be stably prevented that portions other than the stopper contact portion 252 in the first end portion 25 come into contact with the stopper 152. With this structure in which the control member 20 is pushed, the pushed control member 20 pushes down the return member 45, and thereby the stopper 152 protrudes through the through hole 451h, in a tilting movement of the control member 20 in a state in which a predetermined external force is not applied, the stopper 152 does not interfere with the movement of the control member 20. In addition, by setting the protrusion length of the stopper contact portion 252, the contact timing of the stopper contact portion 252 and the stopper 152 when a predetermined external force is applied can be readily set.

The stopper contact portion 252 and the stopper 152 that come into contact with each other regulate a pushing operation on the control member 20. With this structure, for example, when an excessive external force is applied to the control member 20, it can be prevented that a force strong enough to cause plastic deformation in the first interlock member 30 is applied to the first interlock member 30.

As described above, the control device 1 according to the embodiment can reliably regulate a pushing operation while ensuring the area for a tilting movement of the control member 20.

Although the embodiment has been described above, the present invention is not limited to this embodiment. For example, the first turn detection section 60 and the second turn detection section 70 may be of a type other than the electrical-resistance type (for example, a magnetic type), and the displacement detection section 80 may be of a type other than the contact-sensing type (for example, an optical-sensing type or a capacity-sensing type). In the above-described embodiment, the control member 20 can be tilted about each of the first turn axis AX1 and the second turn axis AX2; however, the control member 20 may be tilted about only the first turn axis AX1 (or only about the second turn axis AX2). It is to be understood that any component may be added, any of the above-described components may be omitted, or any of the above-described designs may be modified, or any features of the structures according to the embodiment may be combined appropriately by a person skilled in the art without departing from the scope of the invention, and such modifications are included within the scope of the invention.

What is claimed is:

1. A control device comprising:
   a housing;
   a control member including a shaft portion extending in a direction, the control member being configured to be tilted to turn about a first turn axis intersecting the direction in which the shaft portion extends;
   a first interlock member including a first shaft support portion supported by the housing turnably about the first turn axis, the first interlock member being configured to be turned in conjunction with a tilting operation on the control member;
   a return member configured to apply a return force to return the control member to a neutral position to the control member in which no predetermined external force is applied to the control member;
   an urging member configured to apply the return force via the return member to the control member; and
   a first turn detection section configured to detect a turn of the first interlock member, wherein
   the return member includes:
      a bottom portion in contact with a first end portion that is an end portion of the control member in the extending direction; and
      a receiving portion provided around the bottom portion, the receiving portion receiving an end of the urging member,
   the housing includes a receiving bottom section configured to receive the other end of the urging member,
   the receiving bottom section has a stopper protruding in an urging direction of the urging member,
   the bottom portion has a through hole through which the stopper is configured to be inserted,
   the stopper comes into contact with the first end portion of the control member when the predetermined external force is applied to the control member, and
   the stopper is spaced apart from the first end portion of the control member when the control member is at the neutral position.

2. The control device according to claim 1, wherein a protrusion height of the stopper is set such that the stopper protrudes through the through hole and comes into contact with the first end portion when the predetermined external force for compressing the urging member is applied to the control member.

3. The control device according to claim 1, wherein the first end portion has:
   a bottom contact portion in contact with the bottom portion; and
   a stopper contact portion configured not to come into contact with the bottom portion and to come into contact with the stopper.

4. The control device according to claim 3, wherein the bottom contact portion is located around the stopper contact portion and protrudes toward the bottom portion side more in the extending direction than the stopper contact portion.

5. The control device according to claim 3, wherein the first end portion has a countersunk portion provided around the stopper contact portion.

6. The control device according to claim 1, wherein a portion of the bottom portion around the through hole protrudes more than the other portions.

7. The control device according to claim 1, wherein the stopper is fixed to the receiving bottom section.

* * * * *